Mar. 20, 1923.

R. COFFEEN.
SPOTLIGHT.
FILED JAN. 14, 1920.

Inventor
Roy Coffeen
By Lancaster and Allwine
his Attorneys

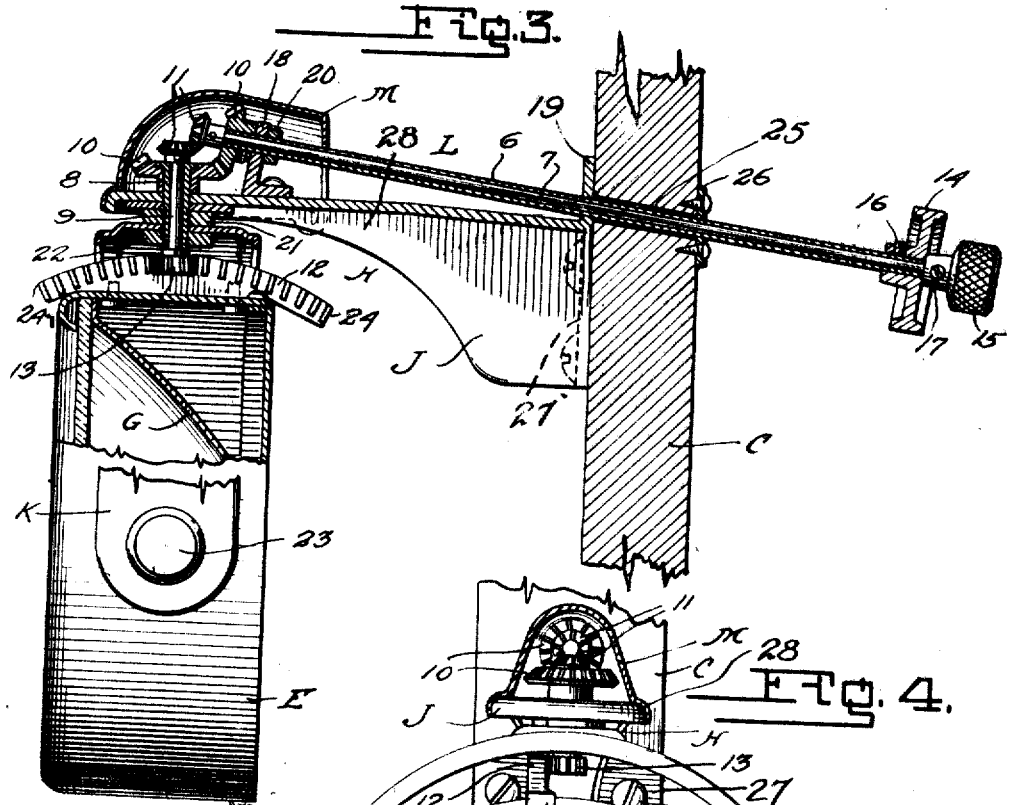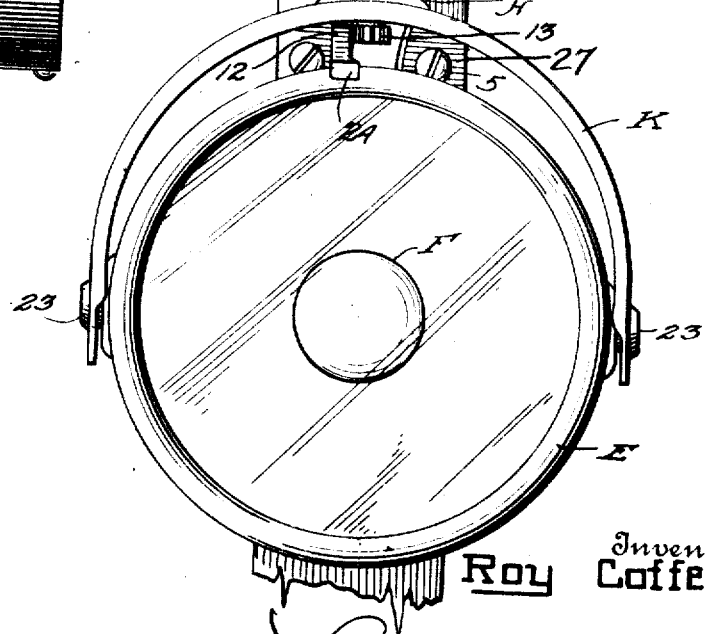

Patented Mar. 20, 1923.

1,448,791

UNITED STATES PATENT OFFICE.

ROY COFFEEN, OF CLEVELAND, OHIO.

SPOTLIGHT.

Application filed January 14, 1920. Serial No. 351,474.

*To all whom it may concern:*

Be it known that I, ROY COFFEEN, a citizen of the United States, residing at Cleveland, in the county of Cuyahoga and State of Ohio, have invented certain new and useful Improvements in Spotlights, of which the following is a specification.

The present invention relates to spot lights and more particularly to such as used on vehicles, as automobiles and the like, which are subjected to considerable vibration and which travel at considerable speed, necessitating quick and ready operation of the spot light to pick out highways and follow closely the right hand side of the highway to avert accident when passing vehicles.

The principal objects of the invention are, to provide spot lights which may be readily attached to the vehicles and operated from the interior of closed or curtained vehicles without the necessity of the operators extending the hands exteriorly of the vehicle; and spot lights having a greater amplitude of movement than those in common use, permitting the operators to more readily direct the rays of light to the interior of the vehicle or to shine upon house numbers or signs which are to the right hand side of the vehicle. In this connection it is pointed out that most motor vehicles now in common use have the operator's seat disposed at the left hand side of the vehicle and it is common practice to mount the spot lights on the left hand side of the vehicle, usually on the left standard of the wind shield in close proximity to the operator's seat. Since the traffic laws of this country require that vehicles keep to the right hand side of the street especially when "slowing down" or coming to a stop in front of houses in cities, it is difficult at night to read house numbers or signs and the spot light now in common use is not well adapted to single out a particular building or house number owing to the fact that the rays of light cannot be directed across the vehicle to the right directly across the vehicle. The present invention provides a spot light in which the main body portion or lamp carrying body may be swung completely around its vertical or upright axis and also adjusted about a horizontal axis, thus overcoming the objectionable features of the types of spot lights in common use and may well be used to illuminate the interior of the vehicle at night such as for the purpose of selecting tools, etc., from the compartment usually provided beneath the passengers' seats.

Other objects and advantages of the invention will appear in the following detailed description, taken in connection with the accompanying drawings, forming a part of this specification, and in which drawings:

Figure 3 is a similar view showing the lamp carrying body in a different position.

Figure 4 is a front elevation of the spot light on its support, a part being shown in vertical section to disclose details.

Figure 1:
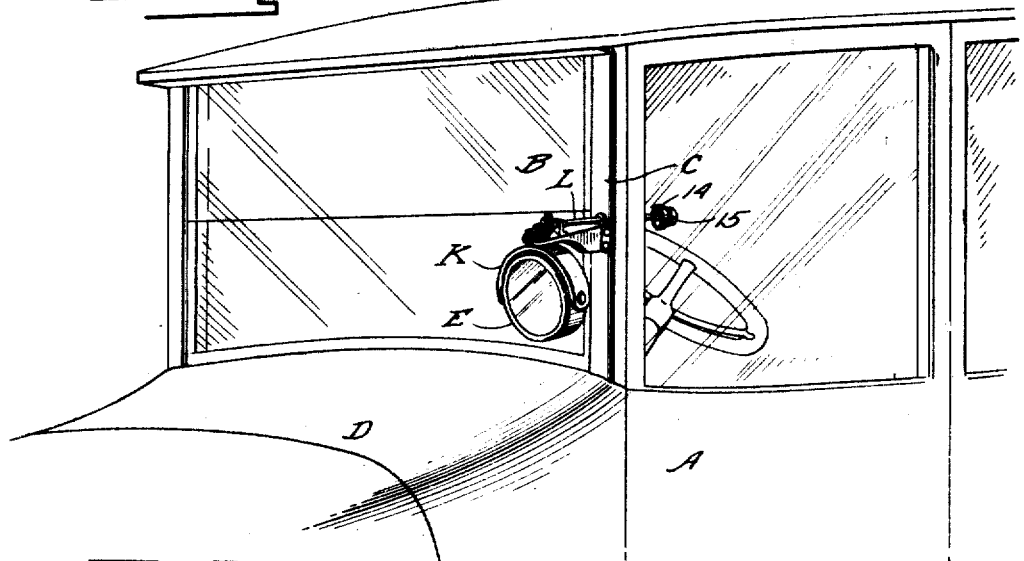
Figure 1 is a fragmentary perspective view of a closed automobile, equipped with a spot light made in accordance with the principle of the present invention.
Figure 2:
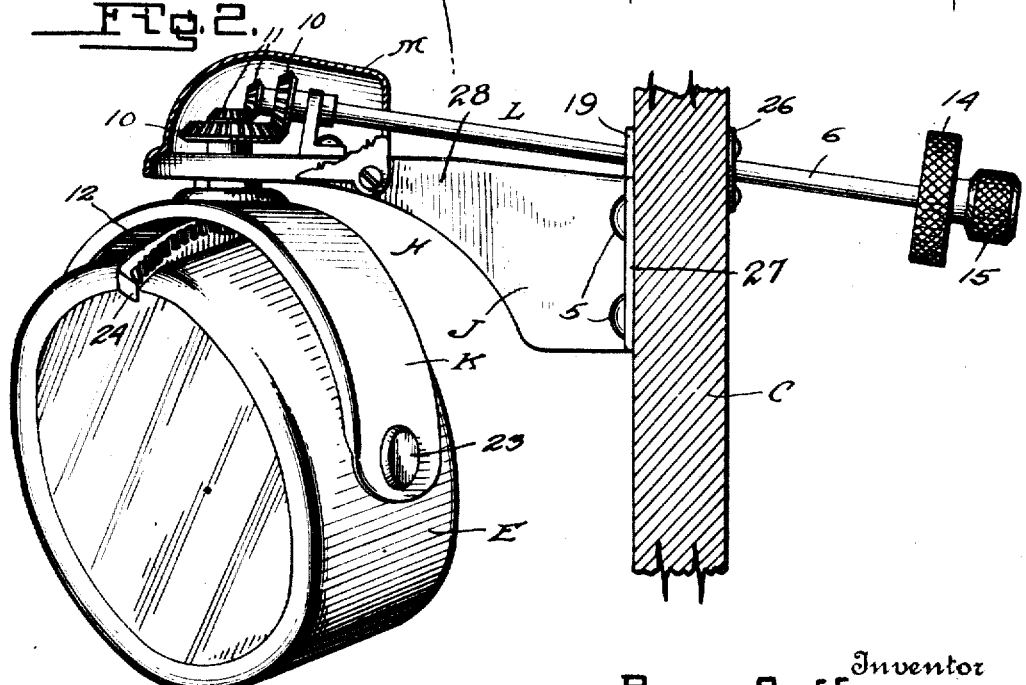
Figure 2 is a view partly in vertical, section, side elevation and perspective showing the spot light as mounted on an upright.

In the drawings, where similar characters refer to similar parts throughout the views. A designates a motor vehicle including a wind shield B, upright C in close proximity thereto and an engine hood D; E a lamp carrying body of any desired shape, in the example shown being drum like and including an electric lamp F, and reflector G; H a support for the body E, in the example shown said support including a bracket J and yoke K, the yoke being pivotally connected to the bracket and revoluble about a vertical axis and the yoke supporting the body E in a manner that the latter may be swung about a horizontal axis; L means for revolving and oscilating the body E; and M a housing which may be provided to protect parts from storm and dust.

One of the principal objects of the invention being to provide a spot light which may be readily operated from the interior of closed or curtained vehicles without the necessity of the operator extending the hand exteriorly of the vehicle, in the example shown, the spot light is disposed in front of the wind shield B above the hood D, being secured through its support H and screws 5 passing through an upright leg 27 of the angular bracket J to the upright C of the wind shield support, the other leg 28 of bracket J being of such a length as to position the lamp carrying body E sufficient distance from any portion of the vehicle to permit of the body E rotating about a vertical axis. When thus positioned the rays of the lamp F may be directed across the vehicle to the right or in other words at right angles to the axis of the vehicle, or the body E may be rotated so as to direct the rays through the wind shield B to the interior of the vehicle for illuminating the same. It is to be understood however that the spot light may be mounted in other positions, much depending upon the design of the vehicle to which it is attached.

In the example shown, the means L comprises co-axial shafts 6 and 7 extending longitudinally of the substantially horizontal leg 28 of bracket J; vertical shafts 8 and 9; bevelled gears 10 for imparting movement of shaft 6 to shaft 8; bevelled gears 11 for imparting movement of shaft 7 to shaft 9; an arcuate toothed rack 12 carried by body E; and a gear wheel 13 on shaft 9 co-meshing with rack 12. Operating handles 14 and 15 may be provided for shafts 6 and 7, respectively these handles being detachably connected to their respective shafts as by set screws 16 and 17. The shafts 6 and 7 may be secured to the support H, as by bearings 18 and 19, the former of which is adjacent to one of the bevelled gears 10, a collar 20 being provided at the side of bearing 18 opposite to this bevelled gear, to prevent longitudinal movement of shaft 6. Shaft 8 also serves as a pivotal connection between the bracket J and yoke K, there being nuts 21 and 22 in threaded engagement with the shaft 8, one nut at each side of the yoke. Thus, by rotation of shaft 6, through handle 14, motion is imparted to shaft 8, through bevelled gears 10, by which the yoke, and hence the body E may be revolved about a vertical axis. The body E being supported by yoke K, as by pivot member 23, may be oscillated upon rotation of shaft 7 through handle 15, motion of the shaft being transmitted to shaft 9 through the bevelled gears 11, the gear 13 acting on rack 12 to move the body about a horizontal axis.

The rack 12 may be provided with abutments 24, at its ends which abutments, by engagement with the gear 13 limit the amplitude of oscillation of the lamp carrying body. The housing M is shown by way of example, as a protector for the gear wheels 10 and 11, and this protector gives finish to the article.

When mounting the spot light into operative relation to the vehicle, the support H is secured to a portion of the vehicle in a manner that the rays of light emitted from the lamp carrying body E are least obstructed by parts of the vehicle during rotation and oscillation of the lamp carrying body and in the example shown this is accomplished by securing the support H to the upright C, a hole 25 being bored or drilled through the upright to accommodate the shafts 6 and 7, the handles 14 and 15 having been removed to facilitate assemblage. These shafts 6 and 7 extend interiorly of the car, after which the handles 14 and 15 are secured in place on their respective shafts. It is to be noted that the bearing 19 may be used to seal the hole 25 exteriorly of the vehicle and if desired a plate 26 may be secured about the shaft 6 interiorly of the vehicle.

In operation, a person has merely to manipulate the handles 14 and 15 in order to direct the rays as desired, this being accomplished from the interior of the vehicle, the handles 14 and 15 being preferably disposed in close proximity to the operator's seat or in other words, so that it may be easily reached. The lamp carrying body E will maintain an adjusted position even though the vehicle is subjected to considerable vibration. The rays of light may be easily directed to the right hand side of the highway when traveling thereover without being obstructed by parts of the vehicle. When it is desired to single out the number of any particular residence, the rays of light may be directed across the vehicle, as hereinbefore set forth, and if it is desired to illuminate the interior of the vehicle by means of the spot light, this may be accomplished by so rotating the body E about its vertical axis and moving it about its horizontal axis so that the rays of light will shine through the wind shield, thus aiding in the selection of tools etc., from the compartment usually provided beneath the seats of motor vehicles.

Changes in details may be made without departing from the spirit or scope of my invention; but,

I claim:

1. A spot light comprising in combination, a bracket including a horizontally disposed supporting leg and an attaching leg in angular relation, the latter adapted for attachment to an upright of a vehicle; a lamp carrying body; means for supporting said lamp carrying body at the end portion of said supporting leg opposite to said attaching leg, to be revoluble about upright axis and oscillatable about a horizontal axis; two shafts extending longitudinally of the supporting leg of said bracket and revolubly supported thereby, said shafts extending from the end portion of said supporting leg adjacent said lamp carrying body to a point beyond said attaching leg; operating handles on said shafts for independent rotation; motion transmitting mechanism operatively connecting one of said shafts and said supporting means for moving said lamp carrying body about said upright axis; and motion transmitting means operatively connecting the other of said shafts to the lamp carrying body, to move the latter about said horizontal axis.

2. In a spot light, the combination of a lamp carrying body, a bracket, a yoke supported by said bracket and revoluble about a vertical axis, said yoke supporting said lamp carrying body to be oscillatable about a horizontal axis, a shaft carried by said bracket, a shaft extending through the connection between said bracket and yoke, gears for imparting movement of said first mentioned shaft to said second mentioned shaft, an arcuate toothed rack carried by said lamp carrying body in its plane of oscillation, said rack provided with abutments at each end, and a gear on said second shaft co-meshing with the teeth of said rack, said last mentioned gear engageable with said abutments to limit the amplitude of oscillation of said lamp carrying body.

ROY COFFEEN.